United States Patent [19]
Pütz

[11] 4,388,665
[45] Jun. 14, 1983

[54] APPARATUS FOR REDUCING ELECTRICAL FAULT VOLTAGES IN ELECTRICAL CONDUCTORS

[75] Inventor: Johnny Pütz, Sissach, Switzerland

[73] Assignee: Oskar Woertz, Inhaber Hans Woertz, Basel, Switzerland

[21] Appl. No.: 179,787

[22] Filed: Aug. 20, 1980

[30] Foreign Application Priority Data

Sep. 11, 1979 [CH] Switzerland ........................ 8192/79

[51] Int. Cl.³ ............................................. H02H 3/22

[52] U.S. Cl. .................................. 361/119; 361/355; 361/419; 361/427

[58] Field of Search ............... 361/117, 118, 119, 120, 361/355, 419, 420, 427; 174/51; 339/198 GA

[56] References Cited

U.S. PATENT DOCUMENTS 4,159,500 6/1979 Baumbach et al. ................. 361/119

FOREIGN PATENT DOCUMENTS 1560168 1/1980 United Kingdom ........ 339/198 GA

*Primary Examiner*—Reinhard J. Eisenzopf
*Attorney, Agent, or Firm*—Watson, Cole, Grindle & Watson

[57] ABSTRACT

Apparatus for reducing surge voltages comprising at least one voltage surge suppressor arranged in a holder which has an insulating housing and connecting terminals for connection of external electrical conductors to the apparatus. A metallic foot is so formed on the insulating housing that it, together with an associated pressure member, enables the apparatus to be mounted and rigidly clamped by way of a screw bolt in the manner of a terminal block or the like on a protective earth collector rail. The foot is electrically connected with one terminal of the surge suppressor. The other terminal of the surge suppressor is connected with at least one connecting terminal. On rigidly clamping the apparatus to the collector rail, which at the same time serves as a carrier rail, the required connection between the surge suppressor and the protective ground is automatically produced. In addition to the surge suppressor, the insulating housing may also include at least one electric filter which is also connected with the metallic foot.

8 Claims, 8 Drawing Figures

APPARATUS FOR REDUCING ELECTRICAL FAULT VOLTAGES IN ELECTRICAL CONDUCTORS

BACKGROUND OF THE INVENTION

1. Field of the Invention

The present invention relates to apparatus for reducing electrical fault voltages in electrical conductors, the apparatus having at least one excess voltage or surge suppressor, and a holder which accommodates the excess voltage or surge suppressor and which contains an insulating housing and electrical connection means for connection of external electrical conductors to the apparatus.

Apparatus of the above type fulfils the purpose of keeping harmful over-voltages away from, or at least reducing them to a tolerable magnitude for, current consumers with sensitive electrical components, such as in particular semi-conductors, such over-voltages arising for instance in atmospheric storms, in coupling or decoupling reactance-compensating capacitors, in short-circuiting, and in nuclear explosions etc.

2. Description of the Prior Art

Surge suppressors for various operational voltages and discharge current magnitudes have been known for some time. They consist for instance of an electrical discharge path filled with a noble gas and/or a voltage dependent electrical resistance ("Varistor") with a non-linear current/voltage characteristic. Various manufacturers also offer matching holders which accommodate one or more surge suppressors and connection terminals for external electrical conductors. These known holders have differing constructional forms which also require different types of mounting and of connection to an external electrical conductor. In practice, the need often arises to mount apparatus of the above-mentioned type in a switch box together with the usual connecting branch, and earthing terminals. Consequently, this has hitherto been relatively complicated and expensive, because on the one hand the commercially available electric terminals and the known noise or fault voltage protection apparatus of the abovementioned type required different securing means and supporting means so that special constructions for at least one part of these securing and supporting means have been necessary. Regard had also to be had to the fact that to achieve a satisfactory protection against fault voltages, especially voltage surges, no unprotected electric supply lines were allowed to be led in the vicinity of and parallel with the protected conductors, this being a requirement which significantly influences the placing of the terminals and of the fault voltage protection apparatus and appreciably restricts the freedom in choice of mechanical securing and supporting means as regards construction and disposition.

It is therefore an aim of the present invention so to construct apparatus of the above-mentioned type for reducing fault voltages in electrical conductors that it should be simply mountable on the same securing and supporting means as commercially available terminal blocks, while at the same time it should assure better discharge of fault voltages to a protective ground conductor.

SUMMARY OF THE PRESENT INVENTION

This aim is achieved by the invention which provides apparatus for reducing electrical fault voltages in electric lines comprising at least one surge suppressor having one electrical terminal and another electrical terminal, a holder for the surge suppressor and containing an insulating housing and a plurality of electrical connection means for connection of external electric leads to the apparatus, said insulating housing having an electrically conductive foot for mounting and securing on a protective ground conductor collector rail, the foot forming one of the electrical connection means and being electrically connected with the aforesaid one terminal of the the surge suppressor.

In a preferred embodiment, the foot for mounting and securing the apparatus on the protective ground lead collector rail may be formed with a profile according to recognized standards i.e. with an essentially U-shaped cross-section having inwardly projecting flanges at the ends of the two limbs of the U, wherein these flanges lie parallel to the web of the U in different planes or in one common plane. Here a pressure member is connected to the foot by means of a screw the pressure member being destined for engaging the flanges of the protective ground collector rail and being movable by means of the screw in a direction towards the foot in order to clamp the flange of the collector rail between the pressure member and the foot.

The housing may, in addition to accommodating at least one surge suppressor, also contain an electric filter which has at least one longitudinal branch between one pair of input and output connecting devices for external leads and at least one transverse branch connected between the longitudinal branch and the foot that is securable on the protective ground lead collector rail. It is then expedient to connect one end of the terminal of the surge suppressor with the inlet terminal device and to connect the end of the transverse branch of the filter that is remote from the foot with the outlet terminal device. By means of such an electric filter, other fault voltages besides voltage surges may be kept away from sensitive current consumers.

DESCRIPTION OF THE PREFERRED EMBODIMENT

Further details of the invention, as well as its advantages, will become clear from the following description, given by way of example, of the preferred embodiments shown in the accompanying drawings, in which.

Figure 1:
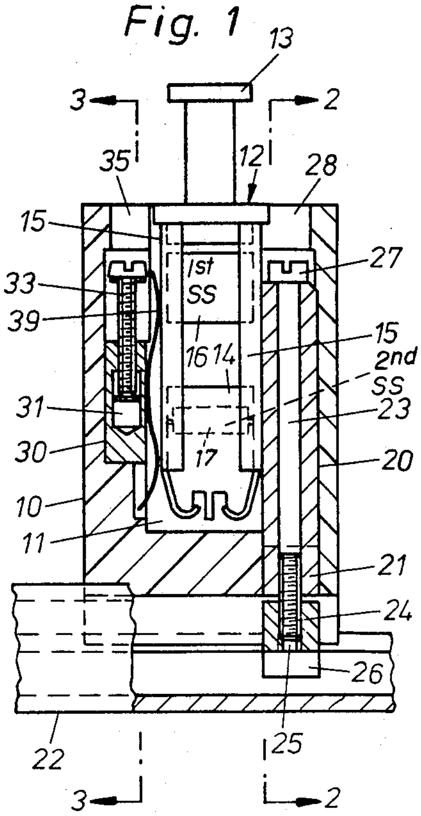
FIG. 1 illustrates a first preferred embodiment of the invention partly in section along the line 1—1 of FIG. 4.

The detailed construction of the apparatus shown in FIGS. 1 to 4 is as follows: an isolating housing 10 has an upwardly open recess 11 serving to receive a push-in plug 12 which is shown only in FIG. 1. The push-in plug 12 has at one end thereof a grip part 13 made of an insulating material and at its opposite end an insulating body 14 the parts of the plug being connected by means of two mutually opposite metal rails or strips 15. A first electric surge suppressor 16 in the form of a gas-discharge tube is disposed between these metallic rails 15, the tube being filled with a noble gas mixture under low pressure and containing two metallic electrodes arranged with small gap therebetween and provided with coatings providing for electronic emission. Each of the electrodes of the tube is electrically conductively connected with a corresponding one of the metallic rails 15. In the insulating body 14 is embedded a second surge suppressor 17 in the form of a voltage-dependent electrical zinc oxide resistor (Varistor), the terminals of which are also connected with the respective metallic rails 15. Such a zinc oxide resistor has a non-linear current/voltage characteristic. So long as the voltage applied to the resistor is smaller than a certain threshold value, the ohmic resistance is very high. However, should the voltage rise above the threshold value, the ohmic resistance rapidly becomes very low. The described push-in plug 12 is manufactured as a unit by a company named Cerberus AG, of Maennedorf (Switzerland), and is marketed under the type designation "UCV 22 C" and "UCV 22 ZS" for an operating voltage of 220 V a.c.

One side of the recess 11 is bounded by a massive contact member 20 with which one of the metallic rails 15 of the push-in plug 12 is in contact when the plug 12 is inserted into the recess 11, as shown in FIG. 1. The contact member 20 together with a foot 21 are made from a single piece of metal as may be seen particularly clearly in FIG. 2. The insulating housing 10 and the metallic foot 21 are constructed for mounting on the flange of a protective ground conductor collector rail 22 with a profile according to recognized standards. Such a collector rail has an essentially U-shaped cross-section with inwardly projecting flanges which lie in different planes parallel to the web of the U. The metallic member forming the foot 21 and the contact piece 20 has a through bore in which a threaded bolt 23 is inserted. The threaded part 24 of the screw bolt 23 engages in a threaded bore 25 of a metallic pressure member 26 which serves to engage under the two flanges of the collector rail 22. The top of the screw bolt 23 is provided with a head 27 which allows the screw bolt to be rotated by means of a screwdriver that can be inserted through an opening 28 in the insulating housing 10. With the aid of the screw bolt 23, the pressure member 26 is linked to the foot 21 and by rotating the screw bolt 23 in one or other angular sense, the pressure member 26 may be moved towards or away from the foot 21 in order to clamp the apparatus to the flanges of the collector rail 22 or to release it from the flanges.

Figure 3:
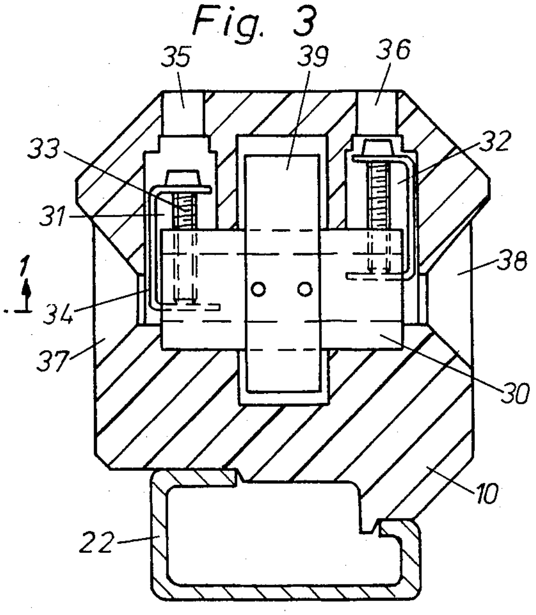
FIG. 3 is an analogous cross-sectional view taken on the line 3—3 in FIG. 1.

On the side of the recess 11 opposite the contact member 20 a metallic contact web 30 is inserted in the insulating housing the two end portions of the web 30 being formed as connection terminals 31 and 32 respectively, for external electrical leads. To this end, at least each end portion of the contact web 30 is hollow to enable the introduction of at least one respective conductor. As may be seen in FIG. 3, each of the connection terminals 31 and 32 is provided in a known manner with a clamping screw 33 and the other shank projects into the opening of the contact web 30 and is engaged by the end of the clamping screw in that opening, so that the clamping screw does not press against the secured electric conductor directly but rather by way of the last-mentioned shank of the clamping stirrup. The clamping screws 33 are turnable with the aid of a screwdriver which can be introduced through an opening 35 or 36 in the insulating housing 10 (FIG. 3). The insulating housing 10 has funnel-shaped insertion openings 37 and 38 to allow an easier insertion of the electric conductors to be clamped in the electrical terminals 31 and 32. The contact web 30 forms an electrical connection between the two connection terminals 31 and 32, and is connected on the side facing the recess 11 with the middle portion of a metallic leaf spring 39 (FIGS. 1 and 3) which serves to contact one of the metallic rails 15 of the push-in plug 12 and to press the other metallic rail 15 of the push-in plug 12 against the contact member 20.

As is shown in FIG. 1, when the push-in plug 12 is inserted into the recess 11 of the insulating housing 10, the electrodes of the surge suppressor 16 as well as the terminal ends of the Varistor 17 embedded in the insulating body 14 are in contact via the metallic rails 15 with on the one hand, the contact spring 39 and the contact web 30 and the connection terminals 31 and 32, and on the other hand, with the contact piece 20, the foot 21, the screw bolt 23 and the pressure member 26.

Figure 2:
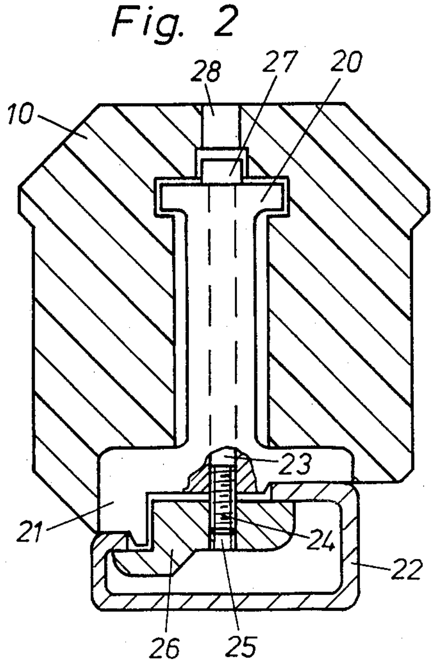
FIG. 2 is a cross-sectional view on the line 2—2 in FIG. 1.
Figure 4:
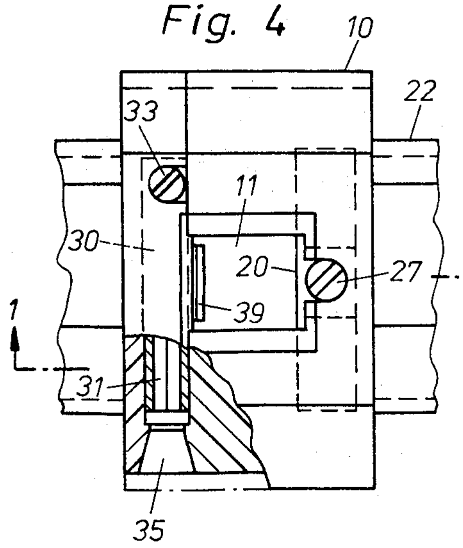
FIG. 4 shows the same apparatus in plan view, and partly in horizontal section in the region of a connecting terminal, wherein a push-in plug provided with a surge suppressor has been omitted.

To use the above-described apparatus, it is mounted on the protective ground conductor collector rail 22 and is rigidly clamped to the flanges of the collector rail with the aid of the pressure member 26 and the screw bolt 23 as shown particularly in FIG. 2. In this way, one electrode of the surge suppressor and one connection terminal of the Varistor 17 are automatically electrically connected with the protective ground conductor collector rail 22. Advantageously, this connection is relatively low in resistance and inductance because the mutually contacting surfaces of the contact member 20 and the metallic rails 15 of the push-in plug 12 lying against it are relatively large, and the contact member 20 and the foot 21 have a relatively large cross-section so that low resistance current flow paths are provided. One of the connection terminals 31 and 32 is connected by way of an external electrical conductor with a current supply network and consequently serves as an input or inlet terminal. The other of the connection terminals 31 and 32 is connected by way of an electrical conductor to a current consumer to be protected against surges and thus serves as an output or outlet terminal. The return line from the current consumer to the current supply network may either be direct or may also be led via the connection terminals of an apparatus similar to that shown in FIGS. 1 to 4, dependent on whether the current return line is un-grounded or grounded. For the supply of a three-phase current to a consumer to be protected against surges, an apparatus of the above construction is used for each phase line. When two or more apparatuses of the above-described type are used, naturally all of these apparatuses may be arranged and rigidly secured to one and the same protective earth line collector rail 22.

It is a particular advantage that the protective earth collector rail 22 may simultaneously serve also as a carrier of electrical terminal blocks, ground terminals etc. constructed for securing on a carrier rail with a profile according to recognized standards. Thus, it becomes possible for several voltage surge suppressor apparatuses of the above-described type and commercially available terminal blocks and ground terminals to be disposed directly next to each other and in any desired sequence on the collector rail 22 in a manner most expedient for a supervisable and short external wiring. In this way, the undesired and harmful inductive and capacitative couplings between protected and unprotected lines as well as excessively high leakage or discharge resistances may be avoided. Furthermore, the unitary manner of fixing for both the surge suppressor apparatus and the terminal blocks and ground terminals facilitates the mounting of these parts and the designing and preparation of compact, space-saving installations. Should the surge suppressors 16 and 17 become unusable due to an excessively high current load, when high surges arise, then the whole push-in plug 12 may be simply pulled out at the grip part 13 and replaced by a new push-in plug of the same construction.

In a non-illustrated variant of the embodiment of the apparatus described with reference to FIGS. 1 to 4, the contact spring 39 is secured not at the contact web 30 connecting the two contact terminals 31 and 32 but instead at the contact member 20 integral with the foot 21. In a further variant, a respective contact spring 39 may be arranged both at the contact web 30 and at the contact member 20 so that each metallic rail 15 of the push-in plug 12 is in contact with one of these springs.

In a further advantageous (but non-illustrated) modification of the above described embodiment, the apparatus may additionally be provided with a second push-in plug 12 and a further pair of connection terminals 31 and 32. The arrangement then is preferably such that the second push-in plug 12 lies to the right in FIG. 1 of the contact member 20 and makes contact with the latter so that preferably the apparatus is constructed symmetrically relative to a plane containing the longitudinal axis of the screw bolt 23 which plane is at right angles to the plane of FIG. 2. Such a construction of the apparatus permits the mutually independent protection against surges of two electrical conductors in a particularly space-saving manner, e.g. the forward and return lines of a supply line of a current consumer.

The further embodiment of the apparatus according to the invention illustrated in FIGS. 5 to 8 has the following detailed construction: an insulating housing 50 is formed for mounting on the protective ground collector rail 22 having a profile according to recognized standards and has a metallic foot 51 serving to make contact with the flanges of the collector rail 22. The foot 51 together with a contact member 52 which projects into the interior 50A of the insulating housing 50 are made from a single piece of metal, e.g. brass. This metallic member 51,52 has a through bore through which a screw bolt 53 extends. The threaded part 54 of the screw bolt engages in a threaded bore of a metallic pressure member 56 which serves to engage from below the two flanges of the collector rail 22. The top of the screw bolt 53 is provided with a head 57 which enables the screw bolt 53 to be rotated by means of a screwdriver which can be inserted through an opening 58 (FIG. 7) of the insulating housing, in order to clamp the foot 51, and thus the whole apparatus, to the flanges of the collector rail 22 or to release it therefrom, as desired.

Altogether four connection terminals 61,62,63, and 64 are arranged in the upper portion of the insulating housing 50 and they are all constructed identically: each of them has a hollow metallic member 65 to guide a conductor to be clamped, a clamping screw 66 and a contact stirrup 67. Each of the clamping screws 66 is rotatable by means of a screwdriver which can be introduced through an associated opening 68 in the insulating housing 50. Furthermore, the metallic member 65 has a transverse bore 69 the axis of which extends parallel with the clamping screw 66. This transverse bore 69 is aligned with an associated opening 70 of the insulating housing 50 and serves as a receptacle or socket e.g. for connection of measuring instruments for voltage, current and/or insulating measurements. The insulating housing 50 has funnel-shaped inlet openings 71, 72, 73 and 74 to permit an easier insertion of the external leads to be clamped into the connection terminals 61 to 64.

Also in the upper portion of the insulating housing 50 and at positions spaced from the terminals 61 and 63, are two bushings 75 and 76 provided with a respective bore 77 aligned with one of the associated openings 78 of the insulating housing 50. A respective connecting plug 80 (FIGS. 5 and 6) electrically connects the connection terminal 61 with the bushing 75 and the connection terminal 63 with the other bushing 76, each connection plug 80 having an insulating grip 81 and two pins 82 which are interconnected by means of a web 83 within the grip 81. The interconnected plug pins 82 fit within the bore 69 of the metallic member 65 of the connection terminal 61 or 63 and into the bore 77 of the bushing 75 or 76.

Figure 5:
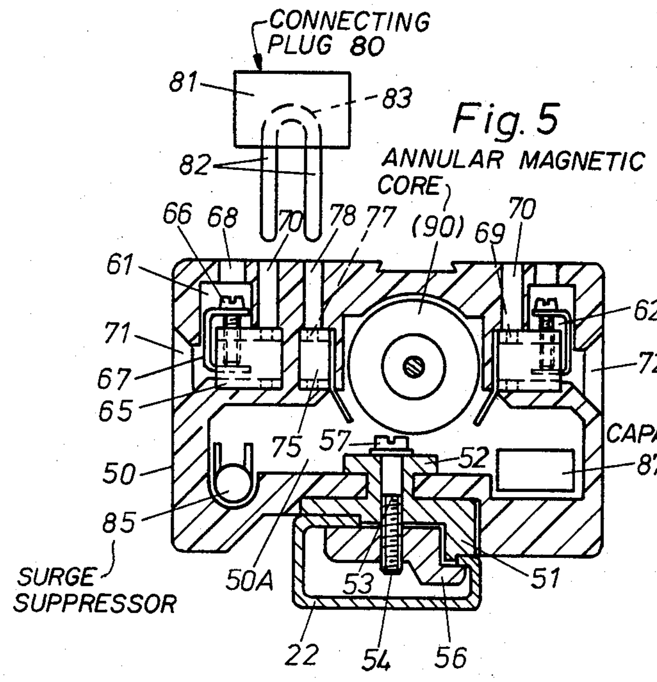
FIG. 5 illustrates a second preferred embodiment of the invention in cross-section on the line 5—5 in FIG. 6.
Figure 6:
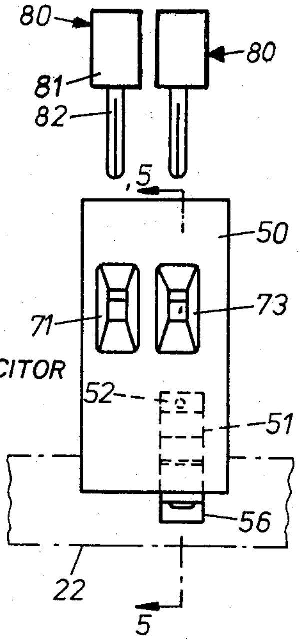
FIG. 6 shows a side view of the same apparatus seen from the left of FIG. 5.
Figure 7:
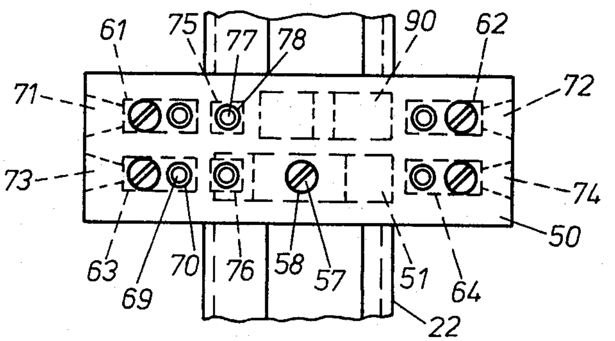
FIG. 7 is a plan view of the embodiment of FIG. 5.

For the sake of greater clarity, one of the connecting plugs 80 is shown in FIG. 5 in its pulled out position, while in FIG. 7 this connecting plug is completely omitted.

Figure 8:
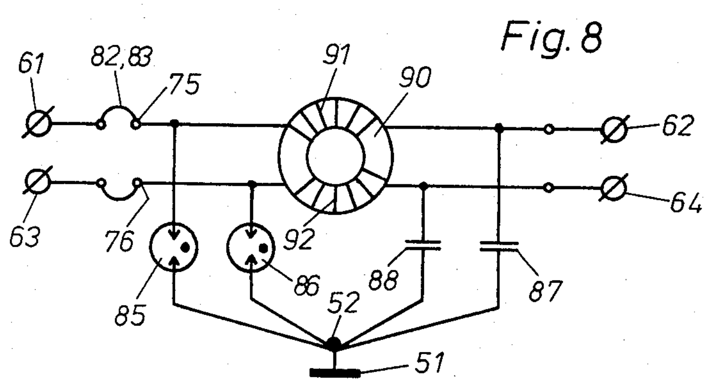
FIG. 8 shows the electrical connection arrangement of the apparatus according to FIGS. 5 to 7.

In the interior 50A of the insulating housing 50 are two surge suppressors 85, 86 (FIGS. 5 and 8) of which only one is visible in FIG. 5, two electric capacitors 87 and 88 of which also only one may be seen in FIG. 5 as well as an annular magnetic core 90 which carries the turns of two choke coils 91 and 92 (FIG. 8). The surge suppressors 85,86 are e.g. gas-filled suppressors such as are marketed under the type designation UC by the Company named Cerberus AG, of Maennedorf (Switzerland). Instead of these, the surge suppressors 85,86 may be voltage-dependent electric zinc-oxide resistors (Varistors) e.g. the types ERZ-CO5 DK-431 from the company named Matsushita Electric, of Osaka, (Japan) or the type SIOVOSO5 K 275 from the company of Siemens Aktiengesellschaft, of Erlangen, (Federal Republic of Germany). These zinc oxide resistors are capable of arresting over-voltage peaks lower than those to which the gas filled surge suppressors can respond. Naturally, also both types of surge suppressors may be present in a parallel connection. The circuit arrangement of all the electrical components is shown in FIG. 8. Accordingly, through an internal conductor not shown in FIG. 5 one choke coil 91 is connected between the bushing 75 and the connection terminal 62 while the other choke coil 92 is connected between the bushing 76 and the connection terminal 64; one surge suppressor 85 is connected between the bushing 75 and the contact member 52 of the foot 51, and the other surge suppressor 86 is connected between the bushing 76 and the contact members 52; one capacitor 87 is connected between the connecting terminal 62 and the contact member 52, and the other capacitor 88 is connected between the connection terminal 64 and the contact member 52. The choke coil 91 and the capacitor 87 together form a first electric filter in which the choke coil represents a longitudinal branch and the capacitor represents a transverse branch. Analogously, the other choke coil 92 and the other capacitor 88 together form a second electrical filter. The magnetic core 90 is common to the two choke coils 91 and 92. The filters serve to reduce fault voltages in a line leading to a sensitive electrical apparatus. To use the apparatus described with reference to FIGS. 5 to 8, it is rigidly clamped with the aid of the pressure member 56 and the screw bolt 53 to the flanges of the collector rail 22 which is electrically conductively connected with protective grounding. External conductors leading to electrical apparatus to be protected against surges and other fault voltages are connected to the terminals 62 and 64 while the connecting terminals 61 and 63 are connected to other external conductors leading to a source of current. Thus the terminals 61 and 63 serve as inlet or input connection terminals while the other terminals 62 and 64 serve as output or outlet connection terminals. Thus the surge suppressor 85 and 86 are disposed on the input side and the capacitors 87 and 88 are disposed on the output side of the choke coils 91 and 92. Should the input and output connection terminals be connected in a reversed manner, the desired protection against excess voltages and other fault voltages would not be assured in the same manner. In operation of the apparatus, the connecting plugs 80 must be inserted. They are only pulled out when either the output connection terminals 62 and 64 are rendered voltage free or measurements have to be carried out at the apparatus. When the connecting plugs 80 are pulled out, electrical measuring instruments can be connected by insertion of measuring lead plugs into the bores 69 and/or 77.

The apparatus of FIGS. 5 to 8 has essentially the same advantages as were mentioned in connection with the description of the first embodiment of FIGS. 1 to 4. Additionally to the protection against over voltages, the apparatus according to FIGS. 5 to 8 also provides extensive suppression of other fault voltages through the surge suppressors 85 and 86 such as maybe caused for instance by switching sparks, high frequency radiations etc.

It will be clear that numerous variations of the apparatus just described are possible. Thus, for instance the two connecting plugs 80 may be replaced by a single connecting plug with four pins connected together in pairs. Equally, instead of the connecting plug 80, other electrical disconnection devices that may be opened and closed as desired may be provided e.g. with at least one outwardly pivotable contact arm. Furthermore, to achieve higher fault voltage damping the electrical filters may be made in a more costly or complicated manner. Furthermore, it is possible to provide, instead of the rigidly built-in surge suppressors 85 and 86, two push-in plugs 12 (as in the first preferred embodiment) in each of which there is at least one surge suppressor. Finally, one may make the apparatus also with a single inlet and a single outlet connection terminal or with more than two inlet terminals and more than two outlet terminals, wherein the number of surge suppressors and electrical filters is at least as great as the number of inlet and outlet connection terminal pairs.

Optionally, the apparatus described with reference to FIGS. 1 to 4 may be provided with a connection plug that can be pulled out in the manner of the plug 80 (FIG. 5) or with some other electrical separation device which may be opened and closed as desired, wherein as in the exemplary embodiment of FIGS. 5 to 8, also sockets for the connection of measuring instruments may be provided.

All the described embodiments may be so constructed that the insulating housing 10 or 50 and the metallic foot 21 or 51 can be mounted on a protective ground connector rail with a profile according to recognized standards or with a profile according to the European standard and may be rigidly clamped thereto with the aid of a matching pressure member. In the protective ground connecting rails according to the three last mentioned standards, the rail has two flanges projecting in an outward direction from the U-shaped limbs.

I claim:

1. Apparatus for reducing electrical fault voltages in electric lines, comprising an insulating housing having a foot and a clamping means arranged for mounting and securing said housing on a support rail, said foot and said clamping means being electrically conductive to allow a good electrical contact with the support rail which serves as a protective ground conductor, said housing being provided with a pair of input and output connection means for external leads, at least one electric filter being disposed within said housing and including at least one series branch having input and output ends connected to said input and output connection means, respectively, and at least one shunt branch having opposite ends, respectively connected to said series branch at a point remote from the input end thereof and to said foot, and said housing further containing at least one surge suppressor having a pair of electrical terminals, one of which being connected to said input end of the series branch of said filter and the other one being connected to said foot.

2. Apparatus according to claim 1, wherein said series branch of said filter includes at least one choke coil and said shunt branch of the filter includes at least one capacitor.

3. Apparatus according to claim 1, further comprising an electric disconnection device, which is openable and closable as desired, arranged between said input connection means and said input end of the series branch of said filter.

4. Apparatus according to any one of claims 1, 2 or 3, wherein said input and output connection means each are provided with a socket for connection thereto of a monitoring instrument.

5. Apparatus for reducing electrical fault voltages in electric lines, comprising an insulating housing having a foot and a clamping means arranged for mounting and securing said housing on a support rail, said foot and said clamping means being electrically conductive to allow a good electrical contact with the support rail which serves as a protective ground conductor, said housing being provided with a first and a second pair of input and output connection means for external electrical leads, at least one pair of first and second electric filters being disposed within said housing, the first filter including at least one series branch having input and output ends connected to the first pair of input and output connection means, respectively, and at least one shunt branch having opposite ends, one end being connected to said series branch at a point remote from the input end thereof and the other end being connected to said foot, said second filter including at least one series branch having input and output ends connected to the second pair of input and output connection means, respectively, and at least one shunt branch having opposite ends, one end being connected to the series branch of said second filter at a point remote from the input end of the last mentioned series branch and the other end being connected to said foot, and said housing further containing at least one pair of first and second surge suppressors each having a pair of electrical terminals, one terminal of the first surge suppressor being connected to the input end of the series branch of the first filter, one terminal of the second surge suppressor being connected to the input end of the series branch of the second filter, and the other terminals of both the first and second surge suppressors being connected to said foot.

6. Apparatus according to claim 5, wherein the series branch of each said first and second filters includes at least one choke coil, the choke coil in the series branch of the first filter and the choke coil in the series branch of the second filter having a common magnetic core, and wherein the shunt branch of each of said filters includes at least one capacitor.

7. Apparatus according to claim 5, further comprising a first electric disconnection device, openable and closable as desired, arranged between the input connection means of said first pair of input and output connection means and the input end of the series branch of said first filter, and a second electric disconnection device, openable and closable as desired, arranged between the input connection means of said second pair of input and output connection means and the input end of the series branch of said second filter.

8. Apparatus according to any one of claims 5, 6 or 7, wherein said input and output connection means each are provided with a socket for connection thereto of a monitoring instrument.

* * * * *